United States Patent [19]

Le Noane

[11] 3,969,015

[45] July 13, 1976

[54] CABLE CONNECTOR FOR OPTICAL FIBER TRANSMISSION

[76] Inventor: Georges E. Le Noane, Kerrougant, Bras, Tregastel, France, 22730

[22] Filed: July 7, 1975

[21] Appl. No.: 593,503

[30] Foreign Application Priority Data

July 26, 1974 France .................... 74.25994

[52] U.S. Cl. .................................................. 350/96 C
[51] Int. Cl.² ............................................ G02B 5/14
[58] Field of Search ........ 250/227; 350/96 R, 96 B, 350/96 C

[56] References Cited
UNITED STATES PATENTS

| | | | |
|---|---|---|---|
| 3,861,781 | 1/1975 | Hasegawa et al. | 350/96 C |
| 3,904,269 | 9/1975 | Lebduska et al. | 350/96 B |
| 3,923,371 | 12/1975 | Dalgleish | 350/96 R |

Primary Examiner—David C. Nelms

[57] ABSTRACT

A connector for cables used for optical fiber transmission, comprising a male half-connector having a rear gripping element including a first nut for securing the armour of a first cable and each fiber thereof and an assembly comprising at least one elastomeric pad-metal piston unit, a front half-connector comprising a second nut, and a further assembly including another piston unit. A female half-connector, built in an analogous manner to the male one, is adapted to engage with the male connector and a second cable, so as to guide the fibers in coaxial direction and alignment with those of the first cable.

4 Claims, 13 Drawing Figures

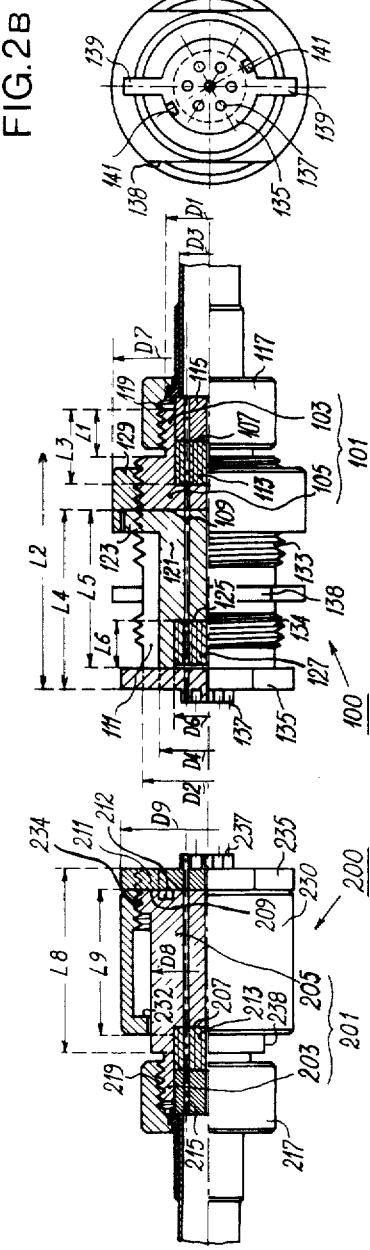

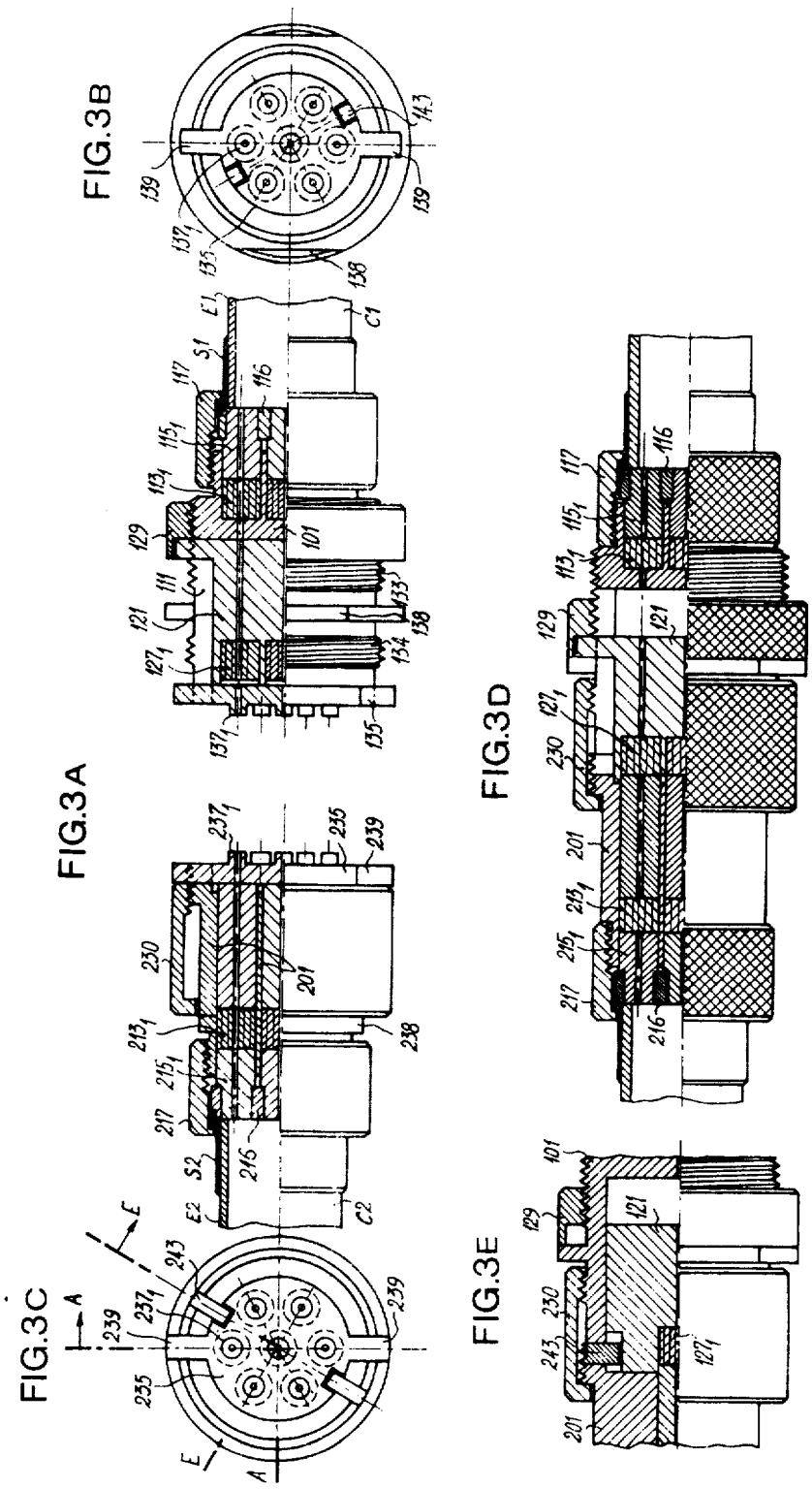

CABLE CONNECTOR FOR OPTICAL FIBER TRANSMISSION

BACKGROUND OF THE INVENTION

1. Field of the Invention

The invention relates to a connector for cables or cable components used for transmission via optical fibres.

2. Description of the Prior Art

Some known connectors of this kind comprise a deformable core formed with apertures for receiving the fibres to be connected, two pressure plates disposed one on each side of the core and a device for subjecting the plates to a compressive force so that the core is radially deformed and the fibres are simultaneously aligned and mechanically secured.

The known connectors have the following disadvantages: They do not provide the minimum positive longitudinal spacing between fibres which is necessary for reducing losses; they do not include means for the production of fibre end surfaces which give optimum optical efficiency; i.e. cross-sectional surfaces in good surface condition; they secure the cables by their elementary fibres only and not by their sheaths or armouring, so that reliability is limited; and they are unsuitable for rapidly assembling and dismantling connections.

OBJECTS OF THE INVENTION

An object of the invention is to provide a connector of the previously defined kind which is free from the aforementioned disadvantages.

Other and further objects will be apparent from the following description and accompanying drawings.

SUMMARY OF THE INVENTION

A connector for cable ends used for transmission via optical fibres according to the invention is characterized in that it comprises (a) a male half-connector comprising a rear gripping element having a first nut for securing, inter alia longitudinally, the armour or casing of a first cable and also securing each fibre of the first cable, by means of a known assembly comprising at least one elastomeric pad-metal piston unit, a front half-connector proper comprising a second nut, and a second assembly comprising at least one elastomeric buffer-metal piston unit, a first embedded moulded washer, preferably of plastics, at its front end, such that each fibre can be given an end surface, preferably by means of a grinding saw, which is both smooth and coplanar with the free front surface of the last-mentioned semi-conductor, the washer subsequently being expelled by the second nut, (b) a female half-connector comprising a rear gripping element having a third screw and a third assembly comprising at least one elastomeric pad-metal piston unit similar to the first unit and adapted to secure a second cable, inter alia in the longitudinal direction, a front half-connector proper comprising a second screw but without an elastomeric pad-metal piston assembly, a second embedded moulded washer at its front end, the washer preferably having the same structure and serving the same purpose as the first washer and being finally expelled by the fourth nut, and in which the fourth and second nuts are designed so that the fourth nut, in cooperation with an outer thread on the male half-connector, is adapted to provide a predetermined assembly in longitudinal abutting relationship by means of a system for keying and locking the two half-connectors in a predetermined angular position relative to one another, and the second nut, in cooperation with the second elastomeric pad-metal piston assembly of the male half-connector, is adapted for finally guiding the fibres of the two half-connectors in the axial direction and for coaxially aligning the fibres of one half-connector with respect to the other.

It can be seen immediately that the minimum spacing between fibres from one half-connector to the other is automatically obtained simply by assembling and locking together the two connector components.

There are a number of possible embodiments of the thus-defined structure of a connector according to the invention.

In a first embodiment, the first, second and third assembly each comprise a single elastomeric pad and a single metal piston, both formed with passages through which the fibres extend, the pad and the piston in each unit being prevented by a groove and tongue system from rotating with respect to one another and with respect to their seat.

In a second embodiment, the first, second and third assembly each comprise a number of elastomeric pad-metal piston units, each formed with at least one passage through which fibres extend, the pad and piston in each unit being prevented by a groove and tongue system from rotating with respect to one another and with respect to their seat, but only in the case where at least two fibres extend through each unit.

Each of these two embodiments has its advantages and its disadvantages. The first has the advantage of a great reduction in bulk, but its construction is more complicated and it is therefore expensive.

BRIEF DESCRIPTION OF THE DRAWING

The invention will be more clearly understood from the following detailed description of two embodiments and from the accompanying drawings, in which:

FIG. 2A is a side view in half-section along line A—A of FIG. 2C, showing a connector according to the invention comprising a male element and a separate female element (a first embodiment);

FIGS. 2B and 2C are end views of the male element and the female element respectively of the connector in FIG. 2A;

FIG. 2D is a side view in half section along line A—A in FIG. 2C of the connector when assembled;

FIG. 2E is a partial side view in half-section along line E—E of FIG. 2C of the connector after assembly; and FIGS. 3A–3E are views similar to those in FIGS. 2A–2E of a second connector according to the invention (a second embodiment).

DESCRIPTION OF THE PREFERRED EMBODIMENTS

Figure 1A:
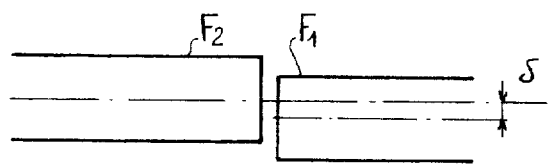
FIGS. 1A, 1B, 1C are diagrams showing the three possible errors in connecting two elementary optical fibres.
Figure 1B:
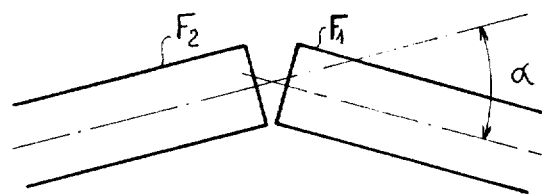
Figure 1C:
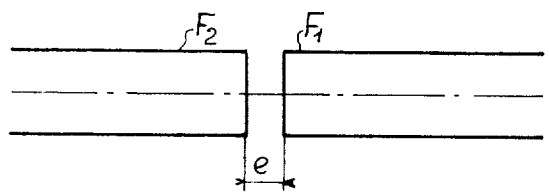

When two elementary optical fibres $F_1$, $F_2$ are to be connected, the following three faults should be reduced to a minimum:

the transverse linear error $\delta$ (FIG. 1A);
the angular error $\alpha$ (FIG. 1B) and
the longitudinal linear error $e$ (FIG. 1C).

By way of example, in the case of a fibre 100 $\mu$m in diameter, the following values appear desirable:

$\delta < 3\ \mu m$, $\alpha <$ a few fractions of a degree, $e < 100\ \mu m$

Furthermore, the facing end surfaces of the optical fibres $F_1$, $F_2$ must be cross-sections and have a good surface state.

Known connectors for cables used for transmission via optical fibres are unsuited for satisfying the last two conditions, i.e. the reduction of $e$ to a minimum and the production of end surfaces having good optical qualities.

As shown in FIGS. 2A–2E, a connector according to the invention comprises a male half-connector 100 and a female half-connector 200.

The male element 100 (to the right in FIG. 2A) comprises a body 101 comprising a rear cylindrical part 103 having a length L1 and an outer diameter D1 and a front cylindrical part 105 having a length L2 and an outer diameter D2 (D2 > D1). Body 101 is formed with a rear coaxial bore 107 which does not extend all the way through, and which has a length L3 and a diameter D3 substantially equal to that of a cable C1 (including its armouring E1); member 101 has a front coaxial bore 109 which does not extend all the way through and has a length L4 and a diameter D4, and also has a diametral slit 111 extending all the way along bore 109 and a cylindrical collar 138 having a diameter D7 and intersected by two flat parts which are symmetrical with respect to the axis of member 101.

A pad 113 made of an elastomer such as silicone rubber and a metal piston 115 fit closely in bore 107. The pad and the piston are both cylindrical, have the same diameter D3 and are in line. Pad 113 and piston 115 are prevented from rotating with respect to one another and with respect to member 101 by both being provided e.g. with a longitudinal tongue engaging in a matching groove in member 101 (the tongue and groove are not shown). They are both provided with aligned passages through which the fibres can extend and which all have the same diameter, e.g. three times that of a fibre. A nut 117 over the rear end of member 101 cooperates with a thread 119 on the outer periphery of part 103 of member 101. After being clamped, the rear shouldered end of nut 117, which has a diameter considerably less than D3, presses on a rear shoulder of an end flange of a metal crimping member S1 anchored to armouring E1 of cable C1, and a front shoulder of nut 117 presses against piston 115 which in turn compresses pad 113. Consequently, the fibres extending through the passages in the pad, the diameter of which is reduced when the pad is compressed, are all rigidly gripped and the cable is secured to element 100, both via its armouring and by all its fibres, inter alia in the longitudinal direction. Note that each fibre is not secured by embedding in the mechanical sense of the term but in a flexible resilient manner, thus considerably reducing the risk of breakage as a result of impacts or vibration.

A substantially cylindrical metal piston 121 having a length L5 (L5<L4) and a diameter D4 can slide with an easy fit in recess 109 in member 101. At the rear, piston 121 has two diametrically opposite plugs 123 adapted to slide with an easy fit in the aforementioned slit 111 in member 101. The front of piston 121 is formed with a coaxial bore 125 which does not extend all the way through, which has a diameter D6 and in which a cylindrical elastomeric plug 127 similar to plug 113 is tightly received. As before, plug 127 is prevented from rotating with respect to piston 121 of member 101 by a groove and tongue system (not shown). Members 127 and 121 are both provided with aligned passages through which the fibres can extend; as before, the passages all have the same diameter, e.g. three times that of a fibre. As before, the passages are in line with identical passages extending through the solid part of member 101 and with the aforementioned passages in plug 113 and piston 115. A nut 129 having an outer diameter D7 has a front coaxial recess 131 and cooperates with a thread 133 in the outer periphery of part 105 of member 101 so as to exert pressure, in a manner to be described hereinafter, against the rear surface of plugs 123 and thus move and slightly compress the elastomeric pad 127.

At its front end, member 101 has an embedded moulded washer 135 having a length slightly less than (L4–L5) and an outer diameter D7. The front of washer 135 is prolonged by a coaxial protuberance 137 in the form of a solid of revolution, e.g. cylindrical or frusto-conical. Washer 135 and protuberance 137 also have passages for fibres, the passages being similar to and in line with the previously-mentioned passages. Washer 135 has two diametrically opposite plugs 139 adapted to slide with a tight fit in slit 111.

The female element 200 (to the left in FIG. 2A) comprises a member 201 comprising a rear cylindrical part 203 having a length L1 and an outer diameter D1 and a front cylindrical part 205 having a length L8 and an outer diameter D8. At its rear, member 201 is formed with a coaxial bore 207 which does not extend all the way through and is similar to 107.

At its front member 201 is formed with a coaxial bore 209 which does not extend all the way through and has a reduced length (L4–L5) and diameter D4; member 201 also has a diametrical slit 211 extending all the way along bore 209, and a groove 212 at the bottom of 209, in which the free end of piston 121 can engage and abut. At its rear, the sylindrical part 215 has two flat parts 238 which are symmetrical with respect to the axis of member 201.

An elastomeric plug 213 similar to 113 and a piston 215 similar to 115 fit tightly in bore 207. A nut 217 similar to 117 cooperates with a thread 219 similar to 119 so that, when the nut is tightened, it presses the rear of an end flange S2 similar to S1 anchored on the armouring E2 of a cable C2, so that element 200 can secure both the armouring and all the fibres of cable C2, inter alia in the longitudinal direction.

A nut 230 having a great length L9 and an outer diameter D9 is provided at its rear end with a coaxial bore 232 having a diameter D8 and slidably mounted on part 205; the front threaded end of nut 230 cooperates with a thread 234 (having a diameter slightly greater than D8) in the front end of member 201 and is also adapted to cooperate with a similar thread 134 in member 101 not far from the free end thereof.

The front end of member 201 has an embedded moulded washer 235 similar to 135, its front being prolonged by a protuberance 237 similar to 137. Washer 235 has two diametrically opposite plugs 239 sliding with a tight fit in the aforementioned slit 211 in member 201.

As before, piston 215, pad 213, member 201 and washers 235, 237 in the female half-connector 200 are prevented from rotating with respect to one another and have passages in line through which the fibres can extend, the passages being similar, inter alia in diameter, to those in the male half-connector 100.

The free front surfaces of the two half-connectors 100 and 200 (after removal of the embedded components 135, 235 respectively) each have two half-notches 141 (or 241) which are diametrically opposite and adapted to cooperate with two keys 143 (or 243) and prevent the two half-connectors from rotating with respect to one another after assembly. The two half-notches 141 (241) are slightly different in size on each half-connector so as to correct mistakes, i.e. prevent any danger of one of the half-connectors being turned round 180°.

When a connector as described according to the invention is used, the following operations must be performed in succession, at least once:

a. First, each cable C1, C2 is secured to the corresponding half-connector after the elementary fibres have been introduced into the passages in the half-connectors and screws 117, 217 respectively have been tightened, the half-connector 100 being gripped by the cylindrical part 138, which is intersected by two flat parts, and the half-connector 200 being gripped by the cylindrical part 238, which is likewise intersected by two flat parts.

b. Next, the two half-connectors are stamped by means of parts 138 and 238 and a grinding saw (similar to a crystal-cutting saw) is used for cutting the fibres flush with the major free front surfaces of the two half-connectors (i.e. by removing protuberances 137, 237 from washers 135, 235), so that the fibres are finally cut level in planes which exactly coincide with the planes of the free front surfaces of the two half-connectors. In order to prevent clearance between the fibres in their passages at the cut, it is advantageous to coat the fibres with a sufficiently viscous liquid which can easily be removed after the cut, e.g. a plastics in solution in a suitable solvent. Next, the embedded components are ejected by operating nuts 129, 230 respectively and the ends of the fibres are cleaned and simultaneously remove the coating liquid (as we have seen) sawdust, electrostatic dust and the like.

c. Next, the front surfaces of the half-connectors are preferably immersed in an index-matching gel which form a bridge between the fibres on each side.

d. The two half-connectors are assembled so that the half-notches 141, 241 for keys are exactly in line, after which the assembly is locked by actuating nut 230 of member 201, which cooperates with thread 134 of member 101 until the nut abuts a rear shoulder of the threaded portion 235 of the female element. In this manner, the free front surfaces of the two elements 100 and 200 are firmly pressed against one another.

e. Finally, the nut 129 of the male element is actuated so that the piston 121 of the male element is pushed back until it abuts the bottom of groove 212 in the female element. Consequently, pad 127 slides over the fibres of the male element until its passages engage the fibres in the female element (since the diameter of the passages is sufficient), after which pad 127 is crushed and finally guides the fibres of each half-connector in the axial direction and ensures that the fibres in one half-connector are in line with the other.

The minimum spacing between fibres, from one connector to the other, is provided in the manner described, simply by cutting the fibres flush with the planes of the free front surfaces of the half-connectors.

The connection is very easily dismantled, by the opposite operations from those described hereinbefore at (d) and (e).

In a first embodiment of the connector described according to the invention, the pad-piston assemblies 113, 115, 213–215 and 121–125 each comprise a single elastomeric pad and a single metal piston.

In a second embodiment (see FIGS. 3A–3E) the same assemblies each comprise a number of elastomeric plug-metal piston units such as $113_1$, $115_1$, $213_1$–$215_1$ and $121_1$–$125_1$, and members 101, 201 and piston 121 have corresponding multiple bores. This embodiment can be applied in two different ways.

In one way, which is shown in the drawings, each plug-piston unit has only a single axial passage through which a single fibre can extend. In such cases it is unnecessary to provide a system (e.g. a groove and tongue system) which prevents each rear metal piston and each associated rear elastomeric pad from rotating with respect to the other member or with respect to the body surrounding them, and prevents the front pad of the male half-connector from rotating with respect to the corresponding front piston.

In the latter case, as can be seen from the dravings, it is advantageous to connect the rear pistons such as $115_1$, $215_1$ by a coupling plate 116, 216 connecting the rear ends of the pistons, and to provide the moulded washers 135, 235 with projections $137_1$, $237_1$, the number of projections being equal to the number of fibres.

Alternatively, a mixed method (not shown) can be used, in which each pad-piston unit has a number of passages for at least two fibres. In that case, it is necessary as before to use a system (e.g. a groove and tongue) preventing each piston and/or each pad from moving relative to the other element and/or relative to the body or piston which encloses it.

What I claim is:

1. A connector for armored cables used for transmission via optical fibres adapted to connect a first cable end having a threaded male element to a second cable end having a threaded female element comprising:

a threaded male connecting element having a body portion, a front half-portion, a rear gripping portion, an elastic unit and a first nut to longitudinally secure the armor of said first cable end and simultaneously secure each optical fibre of said first end, said elastic unit consisting of an elastomer pad-metal piston unit constituting the fibre securing assembly of said male connecting element;

said front half portion of male connecting element consisting of a second nut, a second elastomer pad-metal unit and an embedded washer at the front end thereof whereby each of the ends of the optical fibres of said first cable end lies in the end surface at the face of said embedded washer to provide a smooth surface of fibre ends which is coplanar with the front surface of said washer, and said embedded washer being adapted to be expelled from said fron half connecting element by means of said second nut;

a threaded female connecting element on the second cable end receiving said male connecting element and front half connecting portion, said female connecting element having a body portion, a rear gripping portion, a front half connector portion, a third nut and an elastomer pad-metal piston unit to longitudinally secure said second cable end and the armor of said second end while securing the optical fibres of said second end;

said front half connection portion of said female connecting element having a fourth nut and a second embedded washer at its joining end, the washer adapted to be expelled by said fourth nut of said female element in a manner similar to and simultaneous with the expulsion of the first washer by the second nut when the male and female element are joined;

said second and fourth nuts being constructed, dimensioned and arranged in relation to the outer thread of said male connecting element to provide similar male and female assemblies of similar longitudinal dimensions with the second and fourth nuts providing the ends of said assemblies in abutting relationship and in a predetermined angular position of one assembly with respect to the other;

and said second nut in cooperation with said elastomeric-pad-piston of said male connecting element being adapted for guiding the fibre ends of the two ends in the axial direction while coaxially aligning the fibre ends of the male connecting element with those fibre ends of the female connecting element.

2. A connector according to claim 1, in which each elastomeric pad and metal piston is formed with tongue and groove means and passages through which the optical fibres extend, the pad and the piston in each unit being prevented by said groove and tongue means from rotating with respect to one another and with respect to their seat.

3. A connector according to claim 1, in which each elastomeric pad-metal piston unit is formed with tongue and groove means including a seat therefore and with at least one passage through which the optical fibres extend, the pad and piston in each unit being prevented by said groove and tongue system from rotating with respect to one another and with respect to said seat.

4. A connector according to claim 3, in which the passages in the elastomeric plugs, and the passages in the metal pistons all have the same diameter which is substantially equal to three times the diameter of an optical fibre.

* * * * *